United States Patent
Piotrowski

(10) Patent No.: US 12,447,568 B1
(45) Date of Patent: Oct. 21, 2025

(54) DEDICATED TOOLING FOR SPLIT BALL BEARING ASSEMBLY AND INSTALLATION INTO AN AIRCRAFT ENGINE COMPARTMENT

(71) Applicant: Pratt & Whitney Canada Corp., Québec (CA)

(72) Inventor: Maciej Piotrowski, Rzeszów (PL)

( * ) Notice: Subject to any disclaimer, the term of this patent is extended or adjusted under 35 U.S.C. 154(b) by 0 days.

(21) Appl. No.: 18/737,107

(22) Filed: Jun. 7, 2024

(51) Int. Cl.
*F16C 43/04* (2006.01)
*B23P 19/04* (2006.01)

(52) U.S. Cl.
CPC .............. *B23P 19/04* (2013.01); *F16C 43/04* (2013.01); *F16C 2326/43* (2013.01); *F16C 2360/23* (2013.01)

(58) Field of Classification Search
CPC ........ F16C 43/04; F16C 43/045; F16C 43/06; F16C 43/065
See application file for complete search history.

(56) References Cited

U.S. PATENT DOCUMENTS

| | | | |
|---|---|---|---|
| 1,585,707 A * | 5/1926 | Hartsock | B25B 27/062 29/263 |
| 6,581,288 B1 | 6/2003 | Rybkoski et al. | |
| 7,716,846 B2 | 5/2010 | Sanders | |
| 8,713,800 B2 | 5/2014 | Friedl | |
| 10,514,064 B2 | 12/2019 | White et al. | |
| 11,319,009 B2 | 5/2022 | Derr et al. | |
| 11,518,460 B2 | 12/2022 | Derr et al. | |
| 2019/0249719 A1 | 8/2019 | Amador et al. | |
| 2021/0356059 A1* | 11/2021 | Spears | F16L 21/08 |

FOREIGN PATENT DOCUMENTS

| | | |
|---|---|---|
| CN | 213673909 U | 7/2021 |
| GB | 875000 A | 8/1961 |
| JP | 6644584 B2 * | 2/2020 |

OTHER PUBLICATIONS

Construction Hacks, Underground pipe fix hack Repair a big main line pvc pipe underground—PVC pipe repair made easy, YouTube, Published on Dec. 31, 2019, available at https://www.youtube.com/watch?v=ljjTbN9EcIM (Year: 2019).*

* cited by examiner

*Primary Examiner* — Kyle A Cook
(74) *Attorney, Agent, or Firm* — CANTOR COLBURN LLP

(57) ABSTRACT

A tool for assembly of a ball bearing and for installation of the ball bearing into an aircraft engine compartment is provided. The ball bearing includes an outer bearing ring, bearing balls, a ball cage for holding the bearing balls and a squirrel cage adjacent to the outer bearing ring. The tool includes a guide including a first open end and a pusher into which the guide is insertable. The pusher includes a second open end to support the bearing balls and through which the first open end is translatable, a first flange proximate to the second open end and including a first shoulder for ball cage support and a second flange at a distance from the first flange equal to a height of the squirrel cage and including a second shoulder for squirrel cage support.

20 Claims, 3 Drawing Sheets

DEDICATED TOOLING FOR SPLIT BALL BEARING ASSEMBLY AND INSTALLATION INTO AN AIRCRAFT ENGINE COMPARTMENT

BACKGROUND

The present disclosure relates to tools for ball bearing assemblies and, more particularly, to dedicated tooling for a split ball bearing assembly that prevents ball damage and split face damage and that facilitates installation of the split ball bearing assembly into an aircraft engine compartment.

A ball bearing is a type of rolling-element bearing that uses balls to maintain separation between bearing races. The purpose of a ball bearing is to reduce rotational friction and to support radial and axial loads. The ball bearing achieves this by using at least two races to contain the balls and to transmit the loads through the balls. In most applications, one race is stationary and the other is attached to the rotating assembly (e.g., a hub or shaft). As one of the bearing races rotates it causes the balls to rotate as well. Because the balls are rolling they have a much lower coefficient of friction than if two flat surfaces were sliding against each other.

BRIEF DESCRIPTION

According to an aspect of the disclosure, a tool for assembly of a ball bearing and for installation of the ball bearing into an aircraft engine compartment is provided. The ball bearing includes an outer bearing ring, bearing balls, a ball cage for holding the bearing balls and a squirrel cage adjacent to the outer bearing ring. The tool includes a guide including a first open end and a pusher into which the guide is insertable. The pusher includes a second open end to support the bearing balls and through which the first open end is translatable, a first flange proximate to the second open end and including a first shoulder for ball cage support and a second flange at a distance from the first flange equal to a height of the squirrel cage and including a second shoulder for squirrel cage support.

In accordance with additional or alternative embodiments, the guide includes material which is softer than a material of the bearing balls.

In accordance with additional or alternative embodiments, the guide includes an elongate body having a first inner diameter and the first open end has a second inner diameter which is larger than the first inner diameter.

In accordance with additional or alternative embodiments, the guide and the pusher each include a stopping element to prevent the guide from being slid completely out of the pusher.

In accordance with additional or alternative embodiments, the guide includes a forward part defining the first open end and a rear part having a smaller outer diameter than the forward part, the pusher has an inner diameter equal to an outer diameter of the forward part and the pusher further includes a rear part corresponding to the rear part of the guide and having an inner diameter smaller than the outer diameter of the forward part.

In accordance with additional or alternative embodiments, a distance between the first shoulder and the second open end is sufficient to support the bearing balls vertically in a position corresponding to a groove in the outer bearing ring.

In accordance with additional or alternative embodiments, the first and second shoulders are separated by a distance equal to the height of the squirrel cage.

In accordance with additional or alternative embodiments, the pusher further includes a third flange adjacent to the second flange and including a third shoulder for additional squirrel cage support.

According to an aspect of the disclosure, a ball bearing assembly tooling method for facilitating installation of the ball bearing into an aircraft engine compartment is provided. The ball bearing assembly tooling method includes forming a guide including a first open end, forming a pusher including a second open end, a first flange and a second flange, inserting the guide into the pusher with the guide and the pusher oriented vertically, supporting a squirrel cage on the second flange, an outer bearing ring on the squirrel cage, a ball cage on the first flange and bearing balls on the second open end and sliding the guide through the pusher such that the first open end translates through the second open end and pushes the bearing balls outwardly into the outer bearing ring.

In accordance with additional or alternative embodiments, the guide includes material which is softer than a material of the bearing balls.

In accordance with additional or alternative embodiments, the ball bearing assembly tooling method further includes stopping the guide from being slid out of the pusher.

In accordance with additional or alternative embodiments, the supporting of the bearing balls on the first end includes vertically supporting the bearing balls on the first end in a position corresponding to a groove in the outer bearing ring.

In accordance with additional or alternative embodiments, the ball bearing assembly tooling method further includes measuring a height of the squirrel cage and designing a distance between a first shoulder of the first flange and a second shoulder of the second flange to be equal to the height of the squirrel cage.

According to an aspect of the disclosure, a tooling method for installation of a ball bearing into a compartment of an aircraft engine is provided. The tooling method includes inserting a guide including a first open end into a pusher comprising a second open end and first and second flanges, vertically orienting the guide and the pusher, supporting a squirrel cage on the second flange, an outer bearing ring on the squirrel cage, a ball cage on the first flange and bearing balls on the second open end, sliding the guide through the pusher to translate the first open end through the second open end and to push the bearing balls outwardly into the outer bearing ring, fitting the first open end about an interior body of the compartment to engage the first open end with an inner bearing ring and downwardly pushing the pusher to force the bearing balls, the ball cage, the outer bearing ring and the squirrel cage into the compartment with the bearing balls impinging against the inner bearing ring.

In accordance with additional or alternative embodiments, the tooling method further includes designing the first open end of the guide to fit tightly about the interior body of the compartment.

In accordance with additional or alternative embodiments, the tooling method further includes designing the first open end of the guide to have an outer diameter which is equal to or greater than a minimum outer diameter of the inner bearing ring.

In accordance with additional or alternative embodiments, the guide includes material which is softer than a material of the bearing balls.

In accordance with additional or alternative embodiments, the ball bearing assembly tooling method further includes stopping the guide from being slid out of the pusher.

In accordance with additional or alternative embodiments, the supporting of the bearing balls on the first end includes vertically supporting the bearing balls on the first end in a position corresponding to a groove in the outer bearing ring.

In accordance with additional or alternative embodiments, the ball bearing assembly tooling method further includes measuring a height of the squirrel cage and designing a distance between a first shoulder of the first flange and a second shoulder of the second flange to be equal to the height of the squirrel cage.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In conventional ball bearing assembly processes, damage to the balls and the bearings is common. A typical process flow is as follows: (1) an aft inner ring half is installed into a shaft, (2) a tool is installed to hold a cage inside an outer ring and (3) a front inner ring half is installed. The cage includes two arms that expand against an inner diameter of the cage and thereby transfers loads to the cage. This can cause damage to the cage. The balls of the ball bearing are unsupported and can move against the shaft with a risk of split face scratching and the balls being scratched. Ultimately, in conventional ball bearing assembly processes, there is no radial support for all moving members (i.e., the balls, the cage and the outer ring).

Thus, as will be described below, a dedicated tool is provided for split ball bearing assembly. The dedicated tool generally includes a guide and a pusher. When combined together, the guide and the pusher provide part alignments (i.e., centering) and support for each moving member through an entire assembly sequence.

Figure 3:
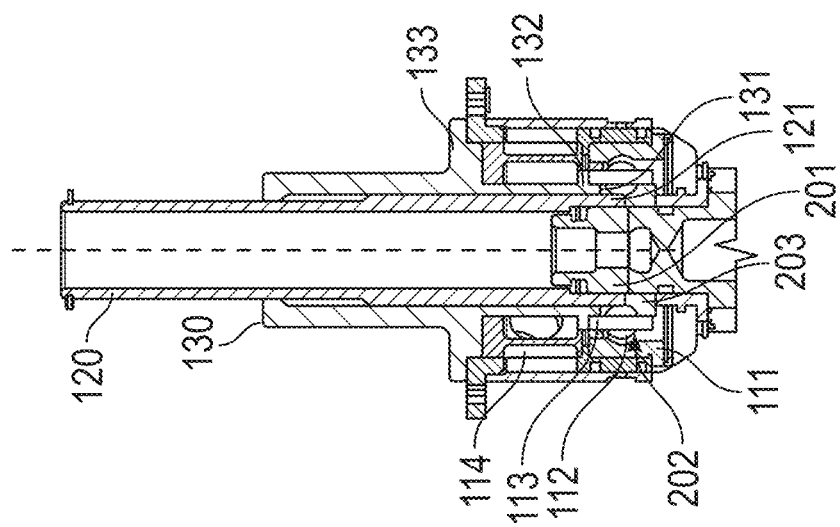
FIG. 3 is a side view of a tool for ball bearing assembly and installation at a third stage of operation in accordance with embodiments.
Figure 2:
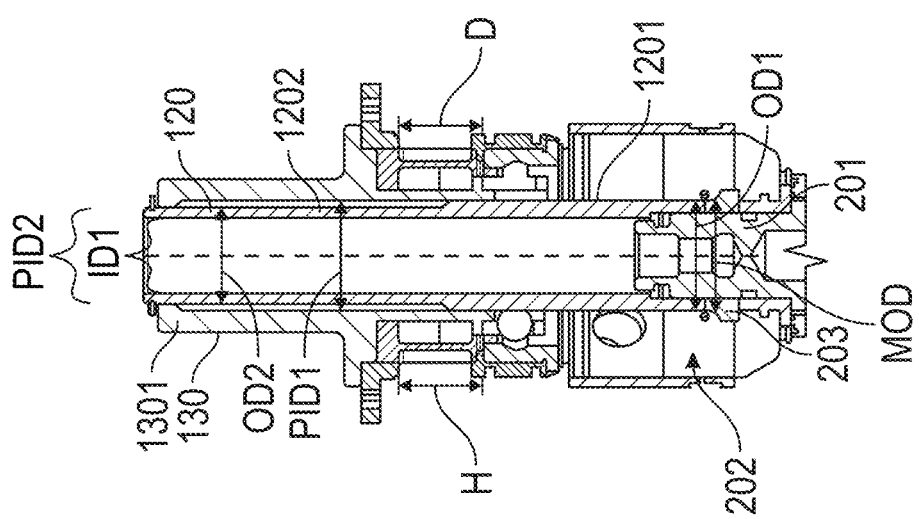
FIG. 2 is a side view of a tool for ball bearing assembly and installation at a second stage of operation in accordance with embodiments.
Figure 1:
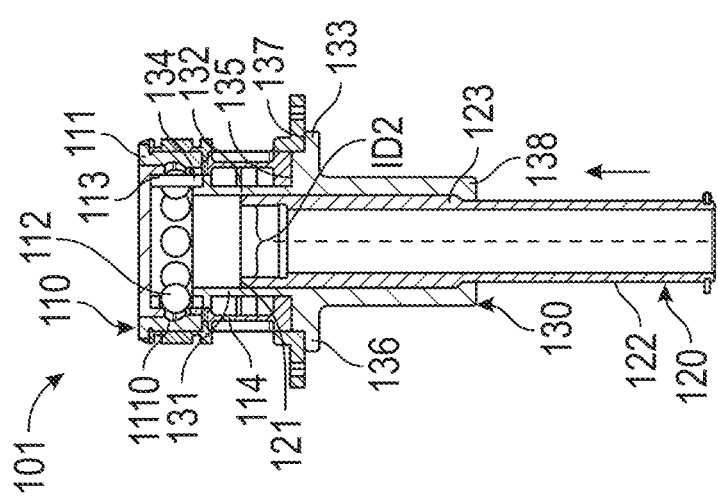
FIG. 1 is a side view of a tool for ball bearing assembly and installation at a first stage of operation in accordance with embodiments.

With reference to FIGS. 1-3, a tool 101 is provided for assembly of a ball bearing 110 where the ball bearing 110 includes an outer bearing ring 111, bearing balls 112, a ball cage 113 for holding the bearing balls 112 and a squirrel cage 114 adjacent to the outer bearing ring 111. The tool 101 includes a guide 120 and a pusher 130 into which the guide 120 is insertable. The guide 120 can be provided as a cylinder and includes a first open end 121. The guide 120 can include material which is softer than a material of the bearing balls 112. The pusher 130 includes a second open end 131, a first flange 132 and a second flange 133. When the pusher 130 is oriented vertically with the guide 120 inserted therein, the second open end 131 can support the bearing balls 112 and the first open end 121 can be translatable through the second open end 131. The first flange 132 is disposed proximate to the second open end 131 and includes a first shoulder 134 for supporting the ball cage 113. The second flange 133 is disposed at a distance D (see FIG. 2) from the first flange 132. The distance D can be equal to a longitudinal height H of the squirrel cage 114. The second flange 133 includes a second shoulder 135 for supporting the squirrel cage 114. The first shoulder 134 and the second shoulder 135 can be disposed at the distance D from one another. The distance D is sufficient to allow the second open end 131 to support the bearing balls 112 vertically in a position corresponding to a groove 1110 in the outer bearing ring 111. The pusher 130 can further include a third flange 136, which is immediately adjacent to the second flange 133 and which includes a third shoulder 137 for additional support of the squirrel cage 114.

The guide 120 can include an elongate body 122 having a first inner diameter ID1 and the first open end 121 can have a second inner diameter ID2 which is larger than the first inner diameter ID1. As such, the guide 120 can be flipped and fit about and onto an interior body 201 of a compartment 202 of an aircraft engine into which the ball bearing 110 is to be installed and assembled (see FIGS. 2 and 3). A length of the guide 120 can be long enough to ensure full engagement of the ball bearing 110 with the guide 120 prior to any subsequent installation processes. In accordance with embodiments, at least the second inner diameter ID2 may be tightly controlled to a tolerance of about 2 thousandths of an inch or less. Additionally, with the guide 120 flipped and fit about and onto the interior body 201, the first open end 121 can engage with an inner bearing ring 203 of the compartment 202. In accordance with embodiments, an outer diameter OD1 of the first open end 121 can be equal to or greater than a minimum outer diameter MOD of the inner bearing ring 203 and can be controlled to a tolerance of about 5 thousandths of an inch or less.

The pusher 130 should provide radial support for the ball cage 113, the outer bearing ring 111 and/or the squirrel cage 114. The first shoulder 132 should support the ball cage 113 during guide 120 insertion underneath the bearing balls 112 but when the tool 101 is flipped, there needs to be clearance between a face of the ball cage 113 and the pusher 130 to avoid load transmittance through the ball cage 113.

With continued reference to FIG. 1, the guide 120 can include a stopping element 123 and the pusher 130 can include a stopping element 138. The stopping element 123 and the stopping element 138 can be disposed to mechanically interfere to thereby prevent the guide 120 from being slid completely out of the pusher 130. With reference to FIG. 2 and in further detail, the guide 120 can include a forward part 1201 having the outer diameter OD1 and defining the first open end 121 and a rear part 1202 having an outer diameter OD2 which is smaller than the outer diameter OD2, the pusher 130 can have an inner diameter PID1 equal to the outer diameter OD2 of the forward part 1201 and the pusher 130 can further include a rear part 1301 corresponding to the rear part 1202 and having an inner diameter PID2 which is smaller than the outer diameter OD1 of the forward part 1201.

Figure 4:
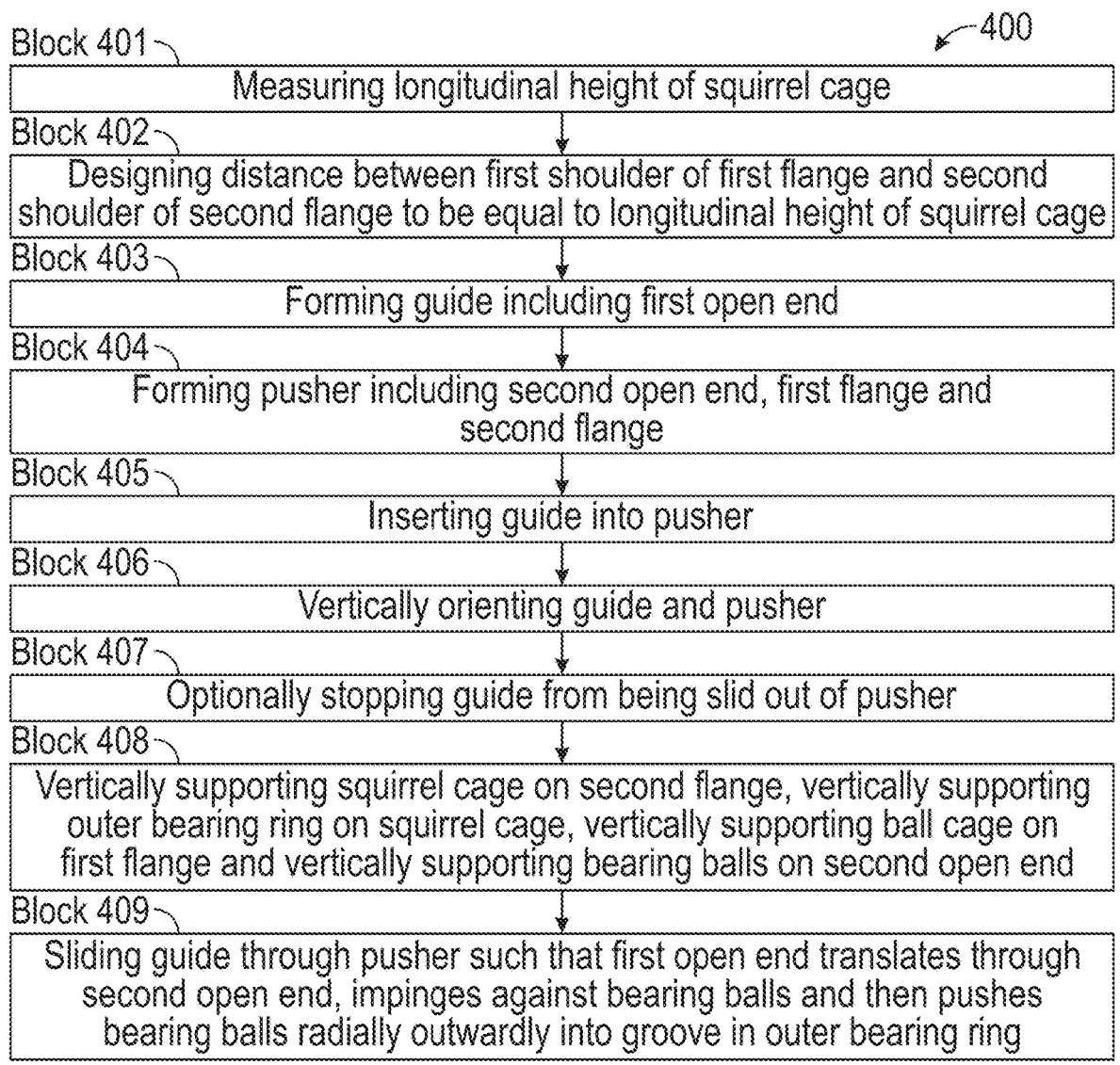
FIG. 4 is a flow diagram illustrating a ball bearing assembly tooling method in accordance with embodiments.

With continued reference to FIGS. 1-3 and with additional reference to FIG. 4, a ball bearing assembly tooling method 400 is provided for facilitating ball bearing installation into the compartment 202 of the aircraft engine.

As shown in FIG. 4, the ball bearing assembly tooling method 400 can initially include measuring the longitudinal height H of the squirrel cage 114 (block 401) and designing the distance D between the first shoulder 134 of the first flange 132 and the second shoulder 135 of the second flange 133 to be equal to the longitudinal height H of the squirrel cage 114 (block 402).

As shown in FIG. 1 and FIG. 4, the ball bearing assembly tooling method 400 includes forming the guide 120 including the first open end 121 (block 403), forming the pusher 130 including the second open end 131, the first flange 132 and the second flange 133 (block 404), inserting the guide 120 into the pusher 130 (block 405), vertically orienting the guide 120 and the pusher 130 (block 406) and optionally stopping the guide 120 from being slid out of the pusher 130 (block 407). At this point, the ball bearing assembly tooling method 400 further includes vertically supporting the squirrel cage 114 on the second flange 133, vertically supporting the outer bearing ring 111 on the squirrel cage 114, vertically supporting the ball cage 113 on the first flange 132 and vertically supporting the bearing balls 112 on the second open end 131 in the position corresponding to the groove 1110 in the outer bearing ring 111 (block 408).

As shown in FIGS. 1 and 2 and FIG. 4, the ball bearing assembly tooling method 400 also includes sliding the guide 120 through the pusher 130 such that the first open end 121 translates through the second open end 131, impinges against the bearing balls 112 and then pushes the bearing balls 112 radially outwardly into the groove 1110 in the outer bearing ring 111 (block 409).

Figure 5:
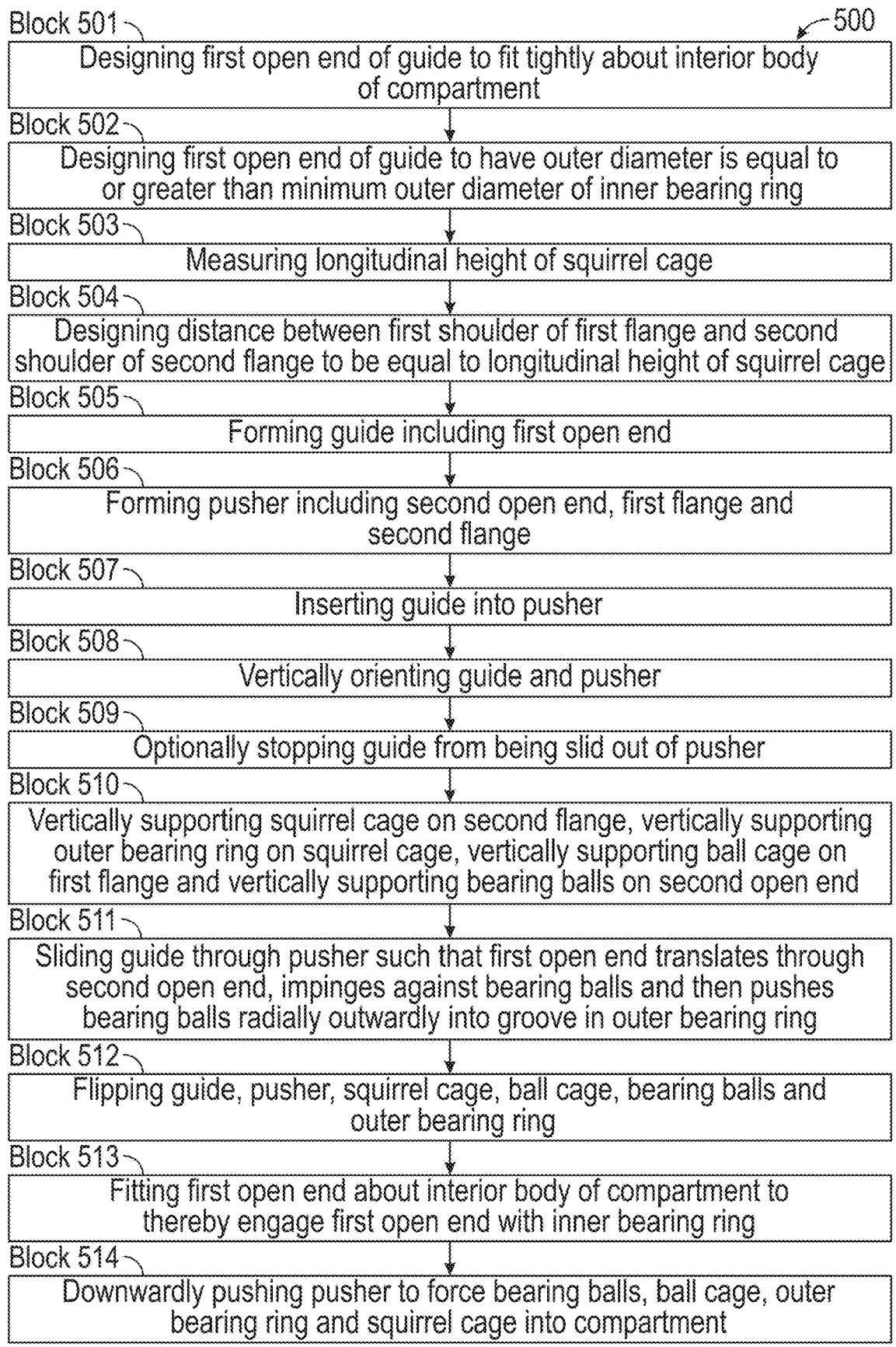
FIG. 5 is a flow diagram illustrating a tooling method in accordance with embodiments.

With continued reference to FIGS. 1-3 and with additional reference to FIG. 5, a tooling method 500 is provided for assembly of the ball bearing 110 and installation of the ball bearing 110 into the compartment 202 of the aircraft engine.

As shown in FIG. 5, the tooling method 500 can initially include designing the first open end 121 of the guide 120 to fit tightly about the interior body 201 of the compartment 202 (block 501) and designing the first open end 121 of the guide 120 to have the outer diameter OD1 which is equal to or greater than the minimum outer diameter MOD of the inner bearing ring 203 (block 502). In addition, the tooling method 500 can initially include measuring the longitudinal height H of the squirrel cage 114 (block 503) and designing the distance D between the first shoulder 134 of the first flange 132 and the second shoulder 135 of the second flange 133 to be equal to the longitudinal height H of the squirrel cage 114 (block 504).

As shown in FIG. 1 and FIG. 5, the tooling method 500 includes forming the guide 120 including the first open end 121 (block 505) and forming the pusher 130 including the second open end 131, the first flange 132 and the second flange 133 (block 506), inserting the guide 120 including the first open end 121 into the pusher 130 including the second open end 131, the first flange 132 and the second flange 133 (block 507), vertically orienting the guide 120 and the pusher 130 (block 508) and optionally stopping the guide 120 from being slid out of the pusher 130 (block 509). At this point, the tooling method 500 further includes vertically supporting the squirrel cage 114 on the second flange 133, vertically supporting the outer bearing ring 111 on the squirrel cage 114, vertically supporting the ball cage 113 on the first flange 132 and vertically supporting the bearing balls 112 on the second open end 131 in the position corresponding to the groove 1110 in the outer bearing ring 111 (block 510).

As shown in FIGS. 1 and 2 and FIG. 5, the tooling method 500 also includes sliding the guide 120 through the pusher 130 such that the first open end 121 translates through the second open end 131, impinges against the bearing balls 112 and then pushes the bearing balls 112 radially outwardly into the groove 1110 in the outer bearing ring 111 (block 511) and flipping the guide 120, the pusher 130, the squirrel cage 114, the ball cage 113, the bearing balls 112 and the outer bearing ring 111 upside down (block 512).

As shown in FIGS. 2 and 3 and FIG. 5, the tooling method 500 then includes fitting the first open end 121 about the interior body 201 of the compartment 202 to thereby engage the first open end 121 with the inner bearing ring 203 (block 513) and downwardly pushing the pusher 130 to force the bearing balls 112, the ball cage 113, the outer bearing ring 111 and the squirrel cage 114 into the compartment 202 with the bearing balls 112 thus impinging against the inner bearing ring 203 (block 514).

Technical effects and benefits of the present disclosure are the provision of dedicated tooling for ball bearing assembly processes that optimizes the processes and avoids split face damage and damage to the balls.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A tool system for ball bearing assembly and for ball bearing installation into an aircraft engine compartment, the tool system comprising:
   a ball bearing comprising an outer bearing ring, bearing balls, a ball cage for holding the bearing balls and a squirrel cage adjacent to the outer bearing ring;
   a guide comprising a first open end; and
   a pusher into which the guide is insertable, comprising:
      a second open end to support the bearing balls and through which the first open end is translatable;
      a first flange proximate to the second open end and comprising a first shoulder for ball cage support; and
      a second flange at a distance from the first flange equal to a height of the squirrel cage and comprising a second shoulder for squirrel cage support.

2. The tool system according to claim 1, wherein the guide comprises material which is softer than a material of the bearing balls.

3. The tool system according to claim 1, wherein the guide comprises an elongate body having a first inner diameter and the first open end has a second inner diameter which is larger than the first inner diameter.

4. The tool system according to claim 1, wherein the guide and the pusher each comprise a stopping element to prevent the guide from being slid completely out of the pusher.

5. The tool system according to claim 1, wherein:
the guide comprises a forward part defining the first open end and a rear part having a smaller outer diameter than the forward part,
the pusher has an inner diameter equal to an outer diameter of the forward part, and
the pusher further comprises a rear part corresponding to the rear part of the guide and having an inner diameter smaller than the outer diameter of the forward part.

6. The tool system according to claim 1, wherein a distance between the first shoulder and the second open end is sufficient to support the bearing balls vertically in a position corresponding to a groove in the outer bearing ring.

7. The tool system according to claim 1, wherein the first and second shoulders are separated by a distance equal to the height of the squirrel cage.

8. The tool system according to claim 1, wherein the pusher further comprises a third flange adjacent to the second flange and comprising a third shoulder for additional squirrel cage support.

9. A ball bearing assembly tooling method using the tool system according to claim 1 for facilitating installation of the ball bearing into the aircraft engine compartment, the ball bearing assembly tooling method comprising:
forming the guide comprising the first open end;
forming the pusher comprising the second open end, the first flange and the second flange;
inserting the guide into the pusher with the guide and the pusher oriented vertically;
supporting the squirrel cage on the second flange, the outer bearing ring on the squirrel cage, the ball cage on the first flange and the bearing balls on the second open end; and
sliding the guide through the pusher such that the first open end translates through the second open end and pushes the bearing balls outwardly into the outer bearing ring.

10. The ball bearing assembly tooling method according to claim 9, wherein the guide comprises material which is softer than a material of the bearing balls.

11. The ball bearing assembly tooling method according to claim 9, further comprising stopping the guide from being slid out of the pusher.

12. The ball bearing assembly tooling method according to claim 9, wherein the supporting of the bearing balls on the second open end comprises vertically supporting the bearing balls on the second open end in a position corresponding to a groove in the outer bearing ring.

13. The ball bearing assembly tooling method according to claim 9, further comprising:
measuring a height of the squirrel cage; and
designing a distance between a first shoulder of the first flange and a second shoulder of the second flange to be equal to the height of the squirrel cage.

14. A tooling method using the tool system according to claim 1 for installation of the ball bearing into the compartment of an aircraft engine, the tooling method comprising:
inserting the guide comprising the first open end into the pusher comprising the second open end, the first flange and the second flange;
vertically orienting the guide and the pusher;
supporting the squirrel cage on the second flange, the outer bearing ring on the squirrel cage, the ball cage on the first flange and the bearing balls on the second open end;
sliding the guide through the pusher to translate the first open end through the second open end and to push the bearing balls outwardly into the outer bearing ring;
fitting the first open end about an interior body of the compartment to engage the first open end with an inner bearing ring; and
downwardly pushing the pusher to force the bearing balls, the ball cage, the outer bearing ring and the squirrel cage into the compartment with the bearing balls impinging against the inner bearing ring.

15. The tooling method according to claim 14, further comprising designing the first open end of the guide to fit tightly about the interior body of the compartment.

16. The tooling method according to claim 14, further comprising designing the first open end of the guide to have an outer diameter which is equal to or greater than a minimum outer diameter of the inner bearing ring.

17. The ball bearing assembly tooling method according to claim 14, wherein the guide comprises material which is softer than a material of the bearing balls.

18. The ball bearing assembly tooling method according to claim 14, further comprising stopping the guide from being slid out of the pusher.

19. The ball bearing assembly tooling method according to claim 14, wherein the supporting of the bearing balls on the second open end comprises vertically supporting the bearing balls on the second open end in a position corresponding to a groove in the outer bearing ring.

20. The ball bearing assembly tooling method according to claim 14, further comprising:
measuring a height of the squirrel cage; and
designing a distance between a first shoulder of the first flange and a second shoulder of the second flange to be equal to the height of the squirrel cage.

* * * * *